United States Patent [19]

Sheerer et al.

[11] 4,452,576

[45] Jun. 5, 1984

[54] TIRE PRESS AND LOADER

[75] Inventors: Paul M. Sheerer, Columbiana; Dallas B. Rupp, Lisbon, both of Ohio

[73] Assignee: NRM Corporation, Akron, Ohio

[21] Appl. No.: 483,093

[22] Filed: Apr. 8, 1983

[51] Int. Cl.³ .............................................. B29H 5/02
[52] U.S. Cl. ...................................................... 425/38
[58] Field of Search ......................... 425/33, 38, 40, 36

[56] References Cited

U.S. PATENT DOCUMENTS

| | | | |
|---|---|---|---|
| 2,997,738 | 8/1961 | Soderquist | 425/38 X |
| 3,065,499 | 11/1962 | Brundage et al. | 425/38 X |
| 3,065,503 | 11/1962 | Mallory et al. | 425/38 |
| 3,267,515 | 8/1966 | Ulm | 425/33 X |
| 3,550,196 | 12/1970 | Gaguit | 425/38 X |
| 3,564,649 | 2/1971 | Soderquist | 425/36 X |
| 3,584,335 | 6/1971 | Ulm et al. | 425/36 |
| 3,845,979 | 11/1974 | Schatz et al. | 425/38 X |
| 3,924,983 | 12/1975 | Barton et al. | 425/38 |
| 4,025,251 | 5/1977 | Cantarutti | 425/38 X |
| 4,169,698 | 10/1979 | Turk et al. | 429/38 X |
| 4,170,442 | 10/1979 | Singh | 425/38 |
| 4,197,062 | 4/1980 | Di Rosa | 425/38 X |
| 4,391,769 | 7/1983 | Ichikawa et al. | 435/38 X |

FOREIGN PATENT DOCUMENTS 1133881  7/1962  Fed. Rep. of Germany ........ 425/40

*Primary Examiner*—J. Howard Flint, Jr.
*Attorney, Agent, or Firm*—Maky, Renner, Otto & Boisselle

[57] ABSTRACT

A tire press and loader includes a tire chuck supporting, horizontal elevator frame which is vertically movable and maintained horizontal under normal operating conditions by drives connected to respective opposite ends of the frame. The loader also includes a safety device operative to cause canting of the frame from such horizontal position upon failure of one of the drives and a control responsive to such canting to render the loader drives inoperative and further to interrupt automatic operation of the press until the fault causing such failure is corrected. The safety device includes holding devices at opposite ends of the horizontal frame which yield to downward driving movement of such ends by respective drives. The holding devices are characterized by flexible elements trained over sprockets connected by slip clutches to a common safety shaft which may rotate in only one direction corresponding to upward movement of the horizontal frame by reason of a one-way clutch or the like. The flexible elements are connected to counterweights or wind-up devices which maintain the flexible elements taut and in engagement with the sprockets. The safety device minimizes damage to the machinery in the event of a drive component failure.

26 Claims, 8 Drawing Figures

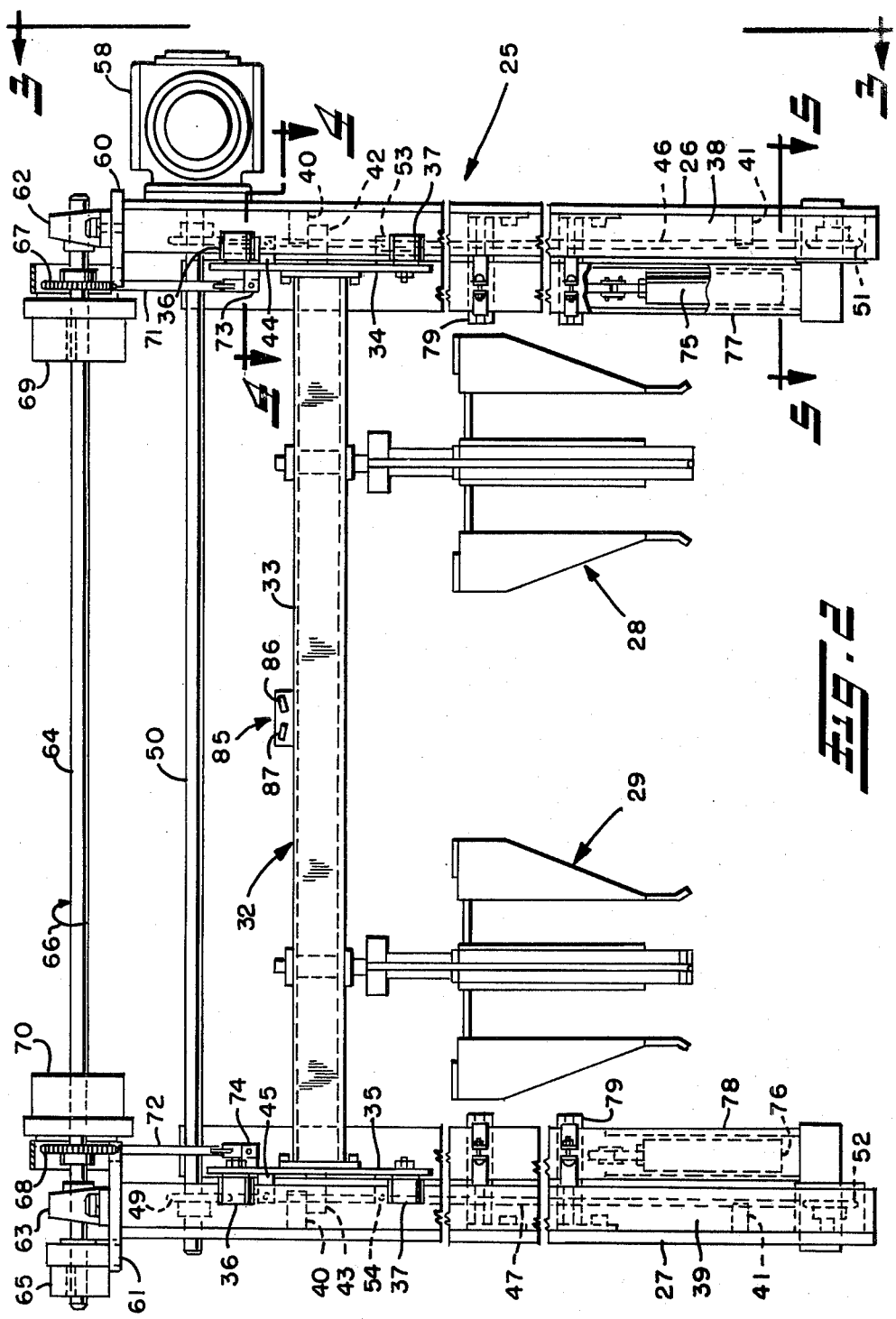

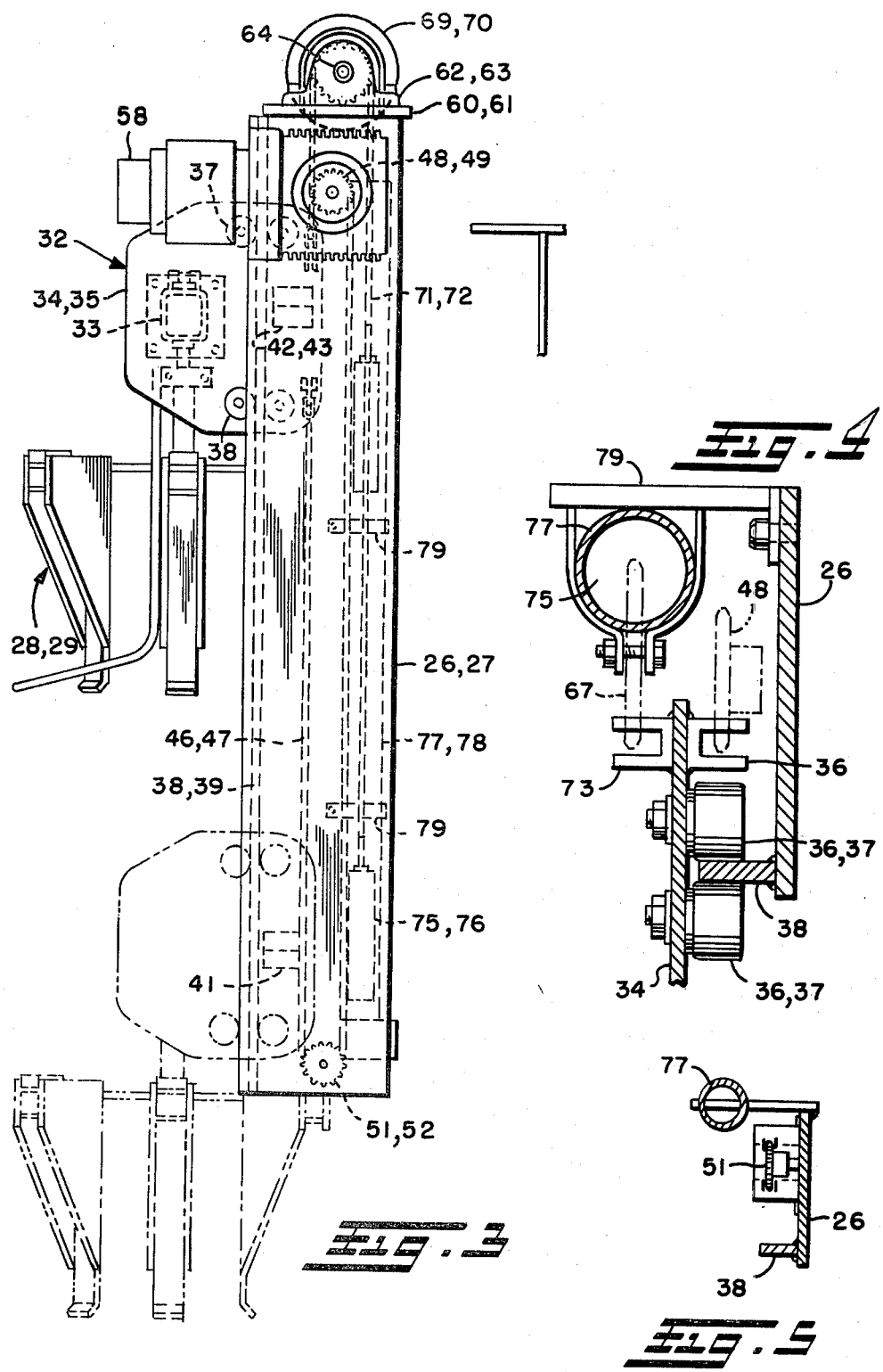

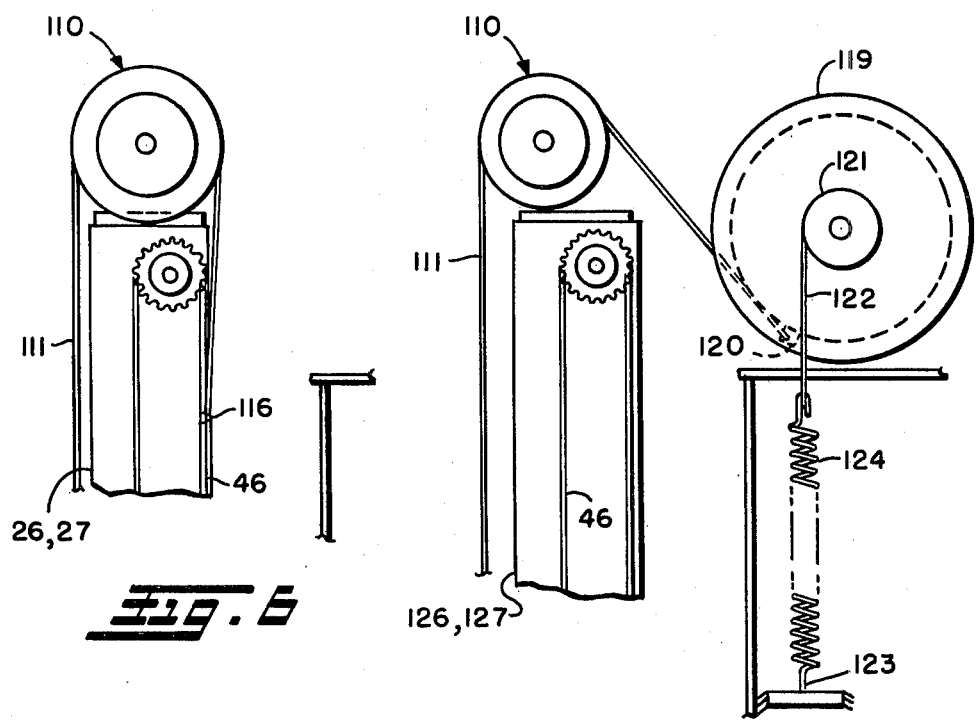
_Fig. 6_
_Fig. 7_
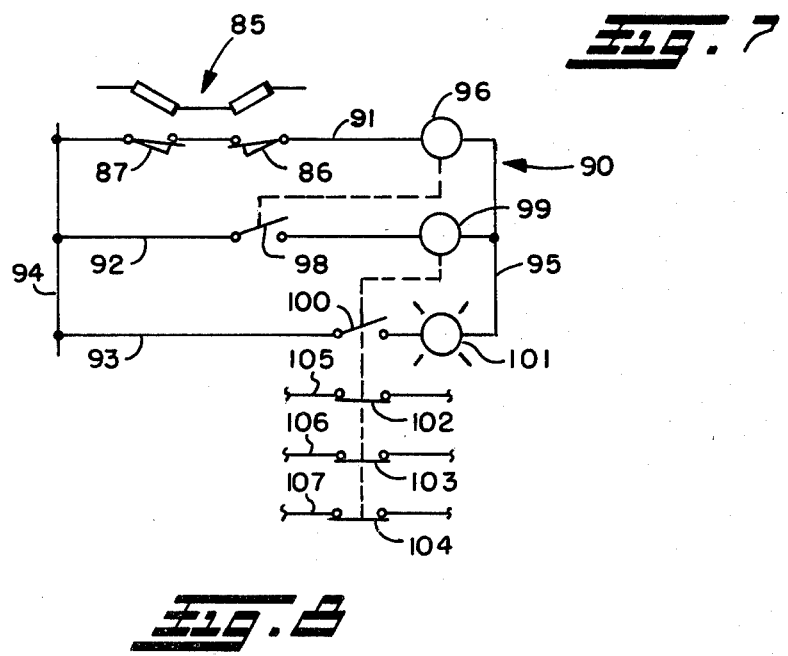
_Fig. 8_

TIRE PRESS AND LOADER

This invention relates generally to tire presses and loaders and, more particularly, to devices for ensuring safe operation of such loaders.

BACKGROUND

For many years, tire curing presses have employed automatic loading mechanisms which typically pick up an uncured or green tire from a loading stand in front of the press and then position the tire in the press for subsequent press closure and cure of the tire. One well-known type of press sold under the trademark AUTO-FORM by NRM Corporation of Akron, Ohio features a loading mechanism which is mounted on a vertically and laterally movable press head, or in case the press head tilts, on one or more fixed stanchions in front of the press. During or following movement of the press head between closed and open positions, the loading mechanism is aligned with the loading stand and lower mold half in such positions, respectively.

The loading mechanism has typically comprised a horizontal elevator frame which supports two laterally spaced tire chucks in the case of a dual cavity press. The horizontal frame rides on side tracks fixed to the press head or stanchions and is independently vertically movable by a reversible drive through a loader drive shaft and sprocket chains trained about drive sprockets on the drive shaft and an idler sprocket and connected at respective opposite ends of the horizontal frame. Rotation of the drive shaft in opposite directions moves the horizontal frame up and down.

If one of the drive chains or associated hardware should fail, continued safe operation of the loader mechanism may be jeopardized. Such failure may result in damage to the loading mechanism and/or press if further operations are not immediately ceased. Most prior art safety devices are connected to the mid-point of the frame and focus on keeping the frame from falling in the event of failure. Even with such devices continued operation of the loader drive and/or press even briefly may result in extensive damage to the mechanisms involved.

One attempt to ensure safe operation of a loading mechanism similar to that just described is disclosed in U.S. Pat. No. 4,319,869. The loader safety device of this patent employs a chain anchored at one end to the loader frame and at its other end to the mid-point of the horizontal elevator frame. Such chain is operatively engaged by a sprocket journaled on a carriage which is laterally positioned by a fluid actuator to raise and lower the horizontal frame. In essence, such device apparently serves to overcompensate for the dead weight of the vertically movable loader components which are vertically positioned by a reversible drive through drive chains at opposite ends of the horizontal frame. By reason of such overcompensation, failure of the drive chains or drive will result in upward travel of the horizontal frame to its uppermost extent of travel.

SUMMARY OF THE INVENTION

Briefly, a tire loader according to the subject invention comprises a tire chuck supporting, horizontal elevator frame which is vertically movable and maintained horizontal under normal operating conditions as by drives connected to respective opposite ends of the frame. The loader also includes a safety device operative to cause canting of the frame from such horizontal position upon failure of one of the drives and a control responsive to such canting promptly to render the loader inoperative. The safety device also desirably interrupts automatic operation of the press until the fault causing such failure is corrected. In any event, the safety device serves to support the elevator frame when the loader lift system fails.

Further in accordance with the invention, holding devices at opposite ends of the horizontal frame yield to downward driving movement of such ends by respective drives but otherwise serve to hold such ends against downward movement. Accordingly upon failure of a drive at one end of the horizontal frame, the corresponding holding device operates to hold such end against downward movement to create canting of the horizontal frame as the other drive continues to drive the other frame end downwardly. Upon failure of a drive during upward movement, canting also is created by the failed end being held stationary by its own weight acting on the corresponding holding device, while the other drive continues.

In general, the holding devices include flexible elements connected between respective ends of the horizontal frame and respective take-up or tensioning devices. The flexible elements may be trained over sprockets connected by slip clutches to a common safety shaft which can rotate in only one direction corresponding to upward movement of the horizontal frame by reason of a one-way clutch or the like. At their ends opposite the horizontal frame, the flexible elements are connected to counterweights or wind-up devices which maintain the flexible elements taut. Accordingly when the loader is driven downwardly by drives at opposite ends thereof, the safety shaft is held against rotation by the one-way clutch with the motion of the loader frame pulling the flexible elements and forcing the slip clutches to slip. If one of the drives at either end of the frame should fail, this creates an imbalance causing the horizontal frame to become tilted out of a level condition. Such tilt condition may be sensed by level switches which automatically shut off the drive and which also may interrupt automatic operation of the loader and press until the fault is corrected. As a result, the safety device minimizes damage to the machinery in the event of a component failure.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 2 is an enlarged front elevational view of an exemplary loader mechanism according to the invention;

FIG. 3 is an enlarged side elevational view of the loader mechanism of FIG. 2 as seen from the line 3—3 thereof;

FIG. 4 is an enlarged partial horizontal section through the loader mechanism of FIG. 2 taken substantially along the line 4—4 thereof;

FIG. 5 is a partial horizontal section through the loader mechanism of FIG. 2 taken substantially along the line 5—5 thereof;

FIG. 6 is a fragmentary side elevational view of another form of loader mechanism according to the invention;

FIG. 7 is a fragmentary side elevational view of still another form of loader mechanism; and FIG. 8 is a schematic illustration of a sensor/control circuit according to the invention.

DETAILED DESCRIPTION

Figure 1:
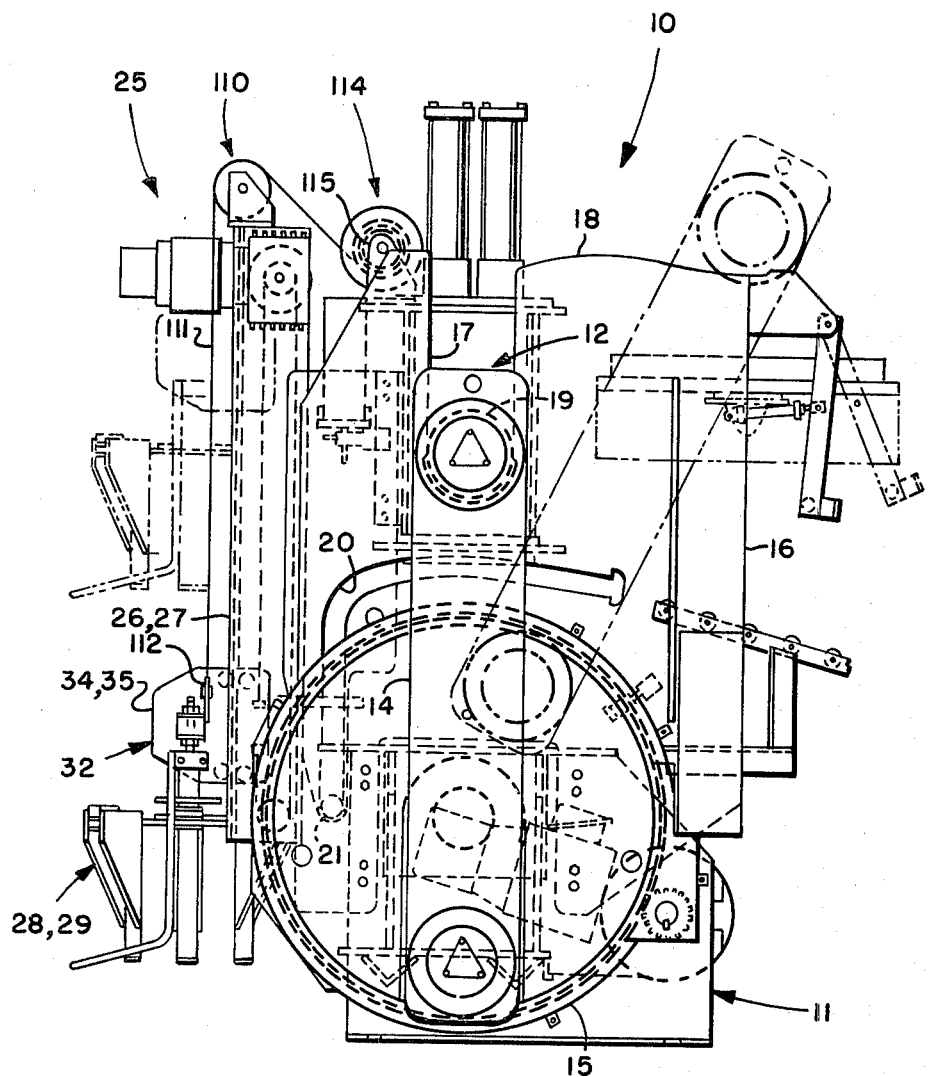
FIG. 1 is a side elevational view of a dual cavity tire curing press with a loader mechanism being illustrated at the left.

Referring now in detail to the drawings and initially to FIG. 1, a dual cavity tire curing press is designated generally by reference numeral 10. The press generally comprises stationary base 11 and a movable head 12 which respectively support bottom and top mold sections that form side-by-side tire curing cavities when the press is closed. With the understanding that the press generally is symmetrical to a vertical center plane passing between the press cavities, the press head 12 can be seen to have trunnion pivots 13 projecting from opposite ends thereof. The trunnion pivots are supported and driven by respective drive links 14 connected between such trunnion pivots and bull gears 15 mounted on opposite sides of the press base 11. Also mounted on opposite sides of the press base 11 are upstanding side plates 16 which have transversely aligned vertical slots 17 and top cam surfaces 18. Such slots and cam surfaces serve to support and guide rollers 19 on the trunnion pivots 13 as the press head is driven upwardly and to the rear when the press opens to the position seen in phantom lines at the right in FIG. 1. The side plates 16 also have cam slots 20, having a configuration matching the vertical slots 17 and cam surfaces 18, which confine guide rollers 21 connected to the press head to maintain the press head against tilting or swinging movement during opening and closing, i.e., to maintain the press head and the top mold sections carried thereby in parallelism with the bottom mold sections mounted in the press base. For a more detailed disclosure of the type of press illustrated, reference may be had inter alia to Brundage et al U.S. Pat. No. 3,065,499, Mallory et al U.S. Pat. No. 3,065,503 and Ulm U.S. Pat. No. 3,267,515.

For an illustration of a "tilt back" press and the types of loaders which may be employed reference may be had to Barton et al U.S. Pat. No. 3,924,983 or Singh U.S. Pat. No. 4,170,442.

The front of the press 10 as seen at the left in FIG. 1 is provided with a green tire loader designated generally by reference numeral 25. The loader is more particularly described below but it is noted here that such loader has vertical side plates 26 and 27 secured to the front edges of respective press side plates 16. In addition, the loader includes a pair of loading chucks 28 and 29 which move vertically with respect to the side plates 26 and 27. When the press is closed, the loading chucks will be vertically aligned with respective green tire support stands located in front of the press. When the press opens, the loader chucks will move upwardly and rearwardly with the press head and into vertical alignment with the bottom mold sections in the press base 11.

As seen in FIGS. 2-5, the loader 25 further comprises a loader frame 32 including a horizontal beam 33 from which the loading chucks 28 and 29 depend. The beam 33 extends between and is connected at opposite ends to vertical end plates 34 and 35. Each of the end plates is provided with two vertically spaced pairs of outwardly directed rollers as indicated at 36 and 37. The rollers 36 and 37 of each pair are positioned on opposite sides of inwardly extending vertical tracks or rails 38 and 39 secured to the insides of the side plates 26 and 27, respectively. Accordingly, the rails serve to guide the loader frame for vertical movement with respect to the side plates between top and bottom stops 40 and 41 fixed to the insides of the side plates. As best seen in FIG. 2, the top and bottom stops are positioned to engage projections 42 and 43 on the end plates 34 and 35 to limit maximum upward and downward movement of the loader frame.

The end plates 34 and 35 also are provided with outwardly projecting top lugs 44 and 45 to which corresponding ends of drive chains 46 and 47 are respectively connected. The drive chains 46 and 47 extend upwardly from such lugs and are trained about respective dirve sprockets 48 and 49 which are mounted at opposite ends of a drive shaft 50. From the drive sprockets 48 and 49, the chains extend downwardly to idler sprockets 51 and 52 mounted on inwardly projecting stub shafts fixed to the side plates 26 and 27 in vertical alignment with the drive sprockets 48 and 49, respectively. From the idler sprockets, the chains then extend upwardly for connection to bottom lugs 53 and 54 on the end plates 34 and 35.

The drive shaft 50 extends between the side plates 26 and 27 and may be journaled for rotation by suitable bearings secured to the side plates. As seen at the right in FIG. 2, the drive shaft is connected to a reversible drive motor 58 mounted on the side plate 26. As will be appreciated, energization of the drive motor in one direction will cause the drive chains vertically to lower the loader frame 32 and thus the loading chucks 28 and 29 carried thereby while energization of the drive motor in the opposite direction will vertically raise the loader frame and loading chucks. Because the chains are coupled to a common drive shaft 50 by matched drive sprockets 48 and 49, opposite ends of the loader frame will be uniformly raised and lowered thereby maintaining the beam 33 in horizontal position during upward and downward movement of the loader frame.

At the top of each side plate 26, 27, there is provided a mounting plate 60, 61 on which bearings 62, 63 are mounted. Journalled by these bearings is a safety shaft 64 which extends therebetween and parallel to the drive shaft 50. As seen at the left in FIG. 2, one end of the safety shaft 64 is connected to a one-way clutch or brake 65 which allows the shaft to rotate only in one direction as indicated by the arrow 66. The safety shaft also is provided with sprockets 67 and 68 at opposite ends thereof which are connected to the shaft by respective slip clutches 69 and 70 which may be provided with wear indicators. Trained about such sprockets 67 and 68 are respective flexible elements or safety chains 71 and 72 which are connected at one end to inwardly projecting lugs 73 and 74 on the loader frame end plates 34 and 35. At their other ends, the safety chains are connected to respective weights 75 and 76 which travel in vertical tubes 77 and 78 fixed to the insides of the side plates 26 and 27 as by brackets 79. As seen in FIG. 3, such tubes 77 and 78 are rearwardly offset from the loader frame 32 to preclude interference with vertical movement of the loader frame. As will be appreciated, such weights serve to maintain the safety chains 71 and 72 taut and in engagement with the sprockets 67 and 68 during raising and lowering of the loader frame.

In operation, the reversible drive motor 58 may be controllably operated to cause the drive chains 46 and 47 vertically to raise and lower the loader frame 32 at desired times dictated by a press cycle controller. At the beginning of the press cycle, the loader frame may be lowered, as seen in solid lines in FIG. 1 and broken lines in FIG. 3, and the tire chucks 28 and 29 actuated to engage green tires positioned on loading stands in front of the press. With the green tires engaged, the loader frame may then be raised to its FIG. 3 solid line position and the press opened to position the tire chucks vertically above respective bottom mold sections of the press. At this point, the loader frame again may be lowered to set the green tires on the bottom mold sections or, more particularly, the bottom toe rings thereof. The tire chucks then may be radially contracted to release the green tires and the loader frame elevated to clear the green tire. At this point, the press may begin to close whereby the loader frame will again be shifted into vertical alignment with the loader stands in front of the press. After the press has closed and the tire curing process commenced, the loader frame may again be lowered to pick up the next set of green tires to be cured.

Whenever the loader frame 32 is being lifted by the drive chains at respective ends thereof, the safety shaft 64 will be rotated by the weighted safety chains 71 and 72 in the direction indicated by arrow 66. However, when the loader frame is driven downwardly, the safety shaft will be held against rotation by the one-way clutch or brake 65 while the motion of the loader frame pulls the safety chains and forces the slip clutches 69 and 70 to yield.

If one of the drive chains 46, 47 should fail during downward movement of the loader frame 32, the holding action of the corresponding safety chain 71, 72 will create an imbalance causing the loader frame to become tilted out of its horizontal or level condition. That is, the safety chain corresponding to the failed drive chain will serve to hold or support the corresponding end of the loader frame against downward movement while the other end of the loader frame continues to be driven downwardly by the intact drive chain. The loader frame also will be canted upon failure of one of the drive chains during upward movement of the drive frame. In this regard, it is noted that the safety chain tensioning weights 75 and 76 have insufficient weight to counterbalance the weight of the loader frame. Consequently, the non-driven or failed end of the loader frame will be held stationary by its own weight acting on the corresponding holding device while the other end thereof will be driven upwardly and result in canting of the loader frame. As will be appreciated, the loader frame will tilt until the provided clearance between its end plates 34 and 35 and the inner edges of the rails 38 and 39 is taken up.

Such canting of the horizontal beam 33 accordingly will be indicative of a loader malfunction that may result in further damage to the loader and/or press unless operations are immediately ceased. As will be appreciated, cessation of loader and press operation may be immediately effected by means of a level sensor and associated control circuitry.

The level sensor seen at 85 in FIG. 2 may include a pair of level sensing mercury switches 86 and 87. Such sensing switches may be conveniently mounted atop and at the center of the horizontal beam 33. As depicted, one switch is mounted to respond to tilting of the horizontal beam in one direction and the other to tilting of the horizontal beam in the other direction.

Referring now to FIG. 8, the control circuitry associated with the level sensor 85 is designated generally by reference numeral 90 and can be seen to include three branch lines 91-93 connected in parallel between power supply lines 94 and 95. In branch line 91, the level sensing switches 86 and 87 are connected in series along with a timer relay 96. When the horizontal beam 33 is level, the sensor switches will be closed and will maintain the timer relay energized. On the other hand, canting of the horizontal beam causing opening of either one of the switches will deenergize the timer relay.

The timer relay 96 has a set of normally closed contacts 98 which are series connected in line 92 with a safety relay 99. Upon initial energization of the timer relay, the contacts 98 will open and stay open until sustained deenergization of such relay for the time delay interval thereof. Consequently, the contacts 98 will remain open and not generate a fault signal notwithstanding any momentary opening of the sensor switches 86 and 87 resulting from transient or sudden movements of the horizontal beam 33. Only upon sustained opening of either one of the sensor switches such as upon canting of the horizontal beam in the aforedescribed manner will the contacts 98 close to energize the safety relay 99.

The safety relay 99 has one set of normally open contacts 100 connected in series with a loader malfunction warning light 101 in the branch line 93 and three sets of normally closed contacts 102-104 respectively connected in lines 105-107. The lines 105-107 may be connected in the main control circuitry for the loader and press to effect desired disablement of the same upon opening of the contacts 102-104. Upon energization of the safety relay, the contacts 100 will close to activate the warning light 101 while the contacts 102-104 will open to open circuit the lines 105-107. Such opening of the contacts 102-104 respectively may serve to render inoperative the loader motor 58, to disable automatic loader operation, and to interrupt automatic operation of the press until the malfunction is corrected.

As will be appreciated, the loader safety system of the invention provides numerous advantages including greater safety against damage to the loader and press machinery and protection against injury to personnel. The system also is easy to install in new or existing presses and does not require adjustments throughout its long wear life. Of particular advantage is the continuous operation of the system and its minimization of shock loads resulting from loader lift drive failure.

Alternative Forms of Safety Chain Wind-Ups

In FIGS. 1, 6 and 7, it will be seen that alternative forms of safety chain take-ups or wind-ups may be utilized in place of the aforedescribed weights 75. In each case, the take-ups or wind-ups serve to maintain the safety chains taut and in engagement with associated sprockets which are coupled to a uni-directional safety shaft by respective slip or torque limiting clutches. In each figure, the sprockets, torque limiting clutches and safety shafts are generally indicated at 110 and can be seen to be mounted atop the loader side plates 26 and 27. Also in each alternative form, one end of each safety chain, generally designated by reference numeral 111, is connected to a respective end of the loader frame 32 as seen at 112 in FIG. 1.

Looking first at FIG. 1, the other end of the safety chain 111 can be seen to be connected to a spring wind-up device 114. Such wind-up device 114 is conveniently mounted by a bracket 115 to a beam fixed to the adjacent press side plate 16. During lowering of the loader frame 32, the safety chain 111 will unwind from the wind-up device 114 against the spring biasing force thereof which maintains the safety chain taut. During raising of the loader frame, the wind-up device will rotate by action of the spring biasing force to take up any slack in the safety chain.

As seen in FIG. 6, the other end of the safety chain 111 alternatively may be directly connected to the respective drive chain 46 at its rearward side as at 116. Operation of the drive chain thus will serve to take up or feed the safety chain during raising or lowering of the loader frame, respectively. It further is noted that the respective forward and rearward legs of the drive and safety chains are essentially parallel for common travel during normal operation of the loader.

In FIG. 7, another form of safety chain wind-up is schematically illustrated at 118. The wind-up 118 is mounted similarly to the wind-up 114 and has a large diameter drum 119 to which the safety chain 111 is connected by a lug 120 at the outer diameter of such drum. The wind-up also has a small diameter hub 121 about which is wrapped flexible element or tensioning cable 122 which is connected at one end to such hub and at its other end to a fixed point 123 on the press frame by means of a tensioning spring 124. As will be appreciated, the tensioning spring and cable bias the take-up drum for rotation in a counterclockwise direction as seen in FIG. 7. As the loader frame is lowered, the safety chain will be payed out from the large diameter drum while the tensioning cable is wrapped about the hub against the biasing force of the tensioning spring. Conversely, the tensioning spring will cause the wind-up drum to take up the safety chain as the loader frame is raised.

Although the invention has been shown and described with respect to preferred embodiments, it is obvious that equivalent alterations and modifications will occur to others skilled in the art upon the reading and understanding of the specification. The present invention includes all such equivalent alterations and modifications, and is limited only by the scope of the following claims.

The embodiments of the invention in which an exclusive property or privilege is claimed are defined as follows:

1. A tire press loader comprising a horizontal beam tire chuck means on said beam, drive means at each end thereof for vertically moving said beam, and flexible element means at each end of said beam requiring to be driven downwardly by said drive means but otherwise holding said frame against downward movement.

2. A tire press loader as set forth in claim 1 including means to maintain said flexible elements taut as said beam moves upwardly.

3. A tire press loader as set forth in claim 2 wherein said last mentioned means includes a spring wind-up.

4. A tire press loader as set forth in claim 2 wherein said last mentioned means includes a counterweight.

5. A tire press loader as set forth in claim 1 wherein said flexible element means are each trained over an idler shaft, and means are provided to preclude said shaft from rotating in one direction.

6. A tire press loader as set forth in claim 5 wherein said flexible element means are drivingly connected to said shaft through slip clutches.

7. A tire press loader as set forth in claim 6 wherein downward movement of said beam causes said clutches to slip.

8. A tire press loader comprising a horizontal beam, a loader chuck mounted on said beam, drive means for said beam operative to move said beam vertically in such horizontal position, and means responsive to a canting of such beam from such horizontal position to stop said drive means.

9. A tire press loader as set forth in claim 8 wherein said drive means is connected to each end of said beam, and means responsive to a disconnect of said drive means at one end of said beam to hold that end against horizontal movement to create such canting as driving of the other end continues.

10. A tire press loader as set forth in claim 9 wherein said last mentioned means comprises flexible elements connected to each end of said beam.

11. A tire press loader as set forth in claim 10 including means to maintain said flexible elements taut as said beam moves upwardly.

12. A tire press loader as set forth in claim 11 including means to preclude downward movement of said flexible elements in the event of a disconnect of said drive means.

13. A tire press loader as set forth in claim 12 wherein said means to preclude comprises a one-way clutch.

14. A tire press loader as set forth in claim 11 wherein said means to maintain comprises a spring wind-up.

15. A tire press loader as set forth in claim 11 wherein said means to maintain comprises a counterweight.

16. A tire press loader as set forth in claim 11 wherein said means to maintain comprises a direct connect of said flexible elements to said drive means.

17. A tire press loader as set forth in claim 8 wherein said means responsive to a canting of said beam includes a level sensing sensor.

18. A tire press loader as set forth in claim 17 wherein said sensor when actuated is operative to stop said drive means.

19. A tire press loader as set forth in claim 17 wherein said sensor when actuated is operative to stop the cycle of the press.

20. A tire press loader as set forth in claim 17 wherein said sensor when actuated is operative on delay to stop said drive means.

21. A tire press loader comprising a horizontal beam tire chuck means on said beam, drive means at each end of said beam to raise and lower said beam in such horizontal position, and means responsive to a disparity between said drive means causing said beam to be altered from its horizontal position to stop said drive means.

22. A tire press loader comprising an elevator frame, a loader chuck mounted on said elevator frame, drive means operating to raise and lower said beam, and holding means operative to yield to downward movement of said frame but otherwise serving to hold such frame against movement.

23. A tire press loader as set forth in claim 22 wherein said holding means includes a flexible element connected to said frame and trained over an idler shaft, means to preclude said shaft from rotating in one direction, and means to drivingly but yieldingly connect said flexible element to said idler shaft.

24. A tire press loader as set forth in claim 23 wherein downward movement of said elevator frame causes said means to connect to yield.

25. A tire press loader as set forth in claim 23 wherein said means to connect includes a slip clutch.

26. A tire press loader as set forth in claim 23 wherein said means to preclude includes a one-way clutch.

* * * * *